No. 755,770. PATENTED MAR. 29, 1904.
A. HARROLD.
TRACTION ENGINE WHEEL.
APPLICATION FILED NOV. 11, 1903.
NO MODEL.

WITNESSES:
W. H. Stough
J. R. Bond

INVENTOR
Amos Harrold
BY F. W. Bond
ATTORNEY

THE NORRIS PETERS CO., PHOTO-LITHO., WASHINGTON, D. C.

No. 755,770.                                          Patented March 29, 1904.

UNITED STATES PATENT OFFICE.

AMOS HARROLD, OF NEWARK, OHIO.

TRACTION-ENGINE WHEEL.

SPECIFICATION forming part of Letters Patent No. 755,770, dated March 29, 1904.

Application filed November 11, 1903. Serial No. 180,680. (No model.)

*To all whom it may concern:*

Be it known that I, AMOS HARROLD, a citizen of the United States, residing at Newark, in the county of Licking and State of Ohio, have invented certain new and useful Improvements in Traction-Engine Wheels; and I do hereby declare that the following is a full, clear, and exact description of the same, reference being had to the annexed drawings, making a part of this specification, and to the figures of reference marked thereon, in which—

Figure 1:
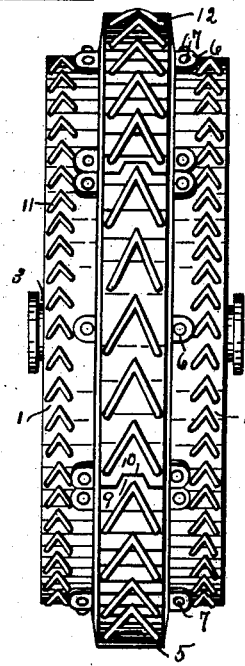
Figure 2:
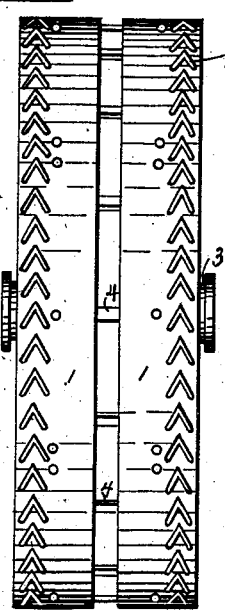
Figure 3:
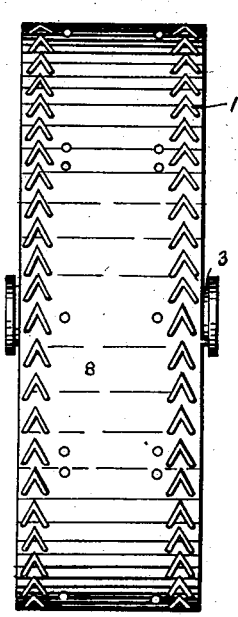
Figure 4:
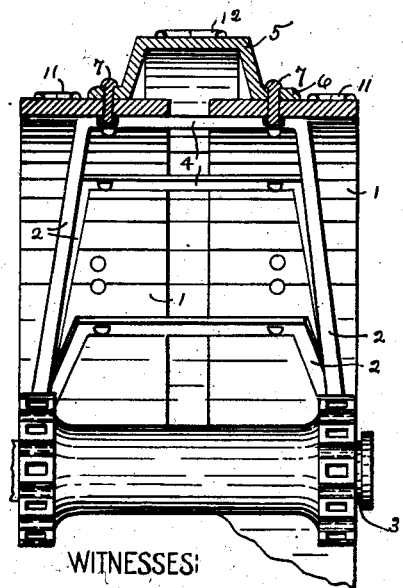
Figure 5:
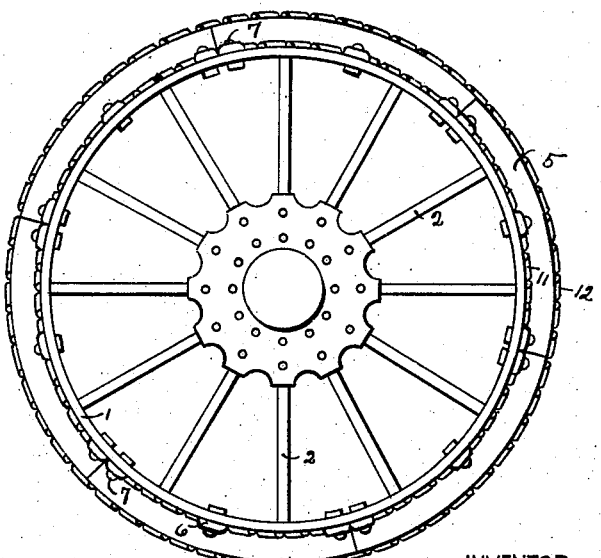

Figure 1 is a view showing the face of the wheel with my improvements attached thereto. Fig. 2 is a view showing the face of the wheel with the outer or narrow-tread tire removed. Fig. 3 is a view showing a wide single tire and the narrow-tread tire removed. Fig. 4 is a sectional view of the tire, showing the different parts properly connected. Fig. 5 is a side elevation of the wheel, showing the different parts properly connected.

The present invention has relation to wheels for traction-engines or motor-vehicles; and it consists in the novel arrangement hereinafter described, and particularly pointed out in the claims.

The object of the present invention is to provide a wheel for traction-engines or motor-vehicles comprising a wide-tread tire and a narrow-tread tire, the narrow-tread tire being of sufficient width to support the engine or vehicle itself under certain conditions and a wide-tread tire coming into use to support the engine under different conditions.

Similar numerals of reference indicate corresponding parts in all the figures of the drawings.

In the accompanying drawings, 1 represents wide-track tires which may be spaced from each other and held in proper relation with each other by the spokes 2, which spokes are connected to the hub 3 in the usual manner and their outer portions provided with the horizontal portions 4, which horizontal portions are for the purpose of properly connecting the tires 1, said horizontal portions being of sufficient length to provide ample means for securing and holding the tires 1 in proper relative position.

Upon the tires 1 are located the segmental narrow tire-sections 5, which segmental narrow tire-sections 5 are located with reference to each other, so that when placed in proper position upon the tires 1 they will produce a continuous tire upon the circumference of the wheel proper, thereby producing a narrow-tread tire of greater diameter than the diameter of the wheel produced by the tires 1.

In order to provide a means for connecting the segmental tire-sections 5 to the tire 1, said sections are provided with the flanges 6, through which flanges are passed bolts or rivets 7, said bolts or rivets passing through apertures formed in the tires 1, thereby securely connecting the segmental tire-sections 5 and producing a traction-wheel having two separate and distinct treads—one a wide tread and the other a narrow tread.

It is well understood that owing to the various conditions of roads it is sometimes desirable to provide wide-tread wheels and at other times narrow-tread wheels. For instance, upon a soft surface a wide tread is desired and upon a hard surface a narrow tread is desired, owing to the fact that a narrow tread does not have the same amount of surface, and in case the contact portion of the wheel sinks into a soft surface less material must be displaced with a narrow tread than with a wide one. It will also be understood that when the roads are hard and little sand is upon the surface a narrow tread is preferable, owing to the fact that small loose stones are not as liable to be encountered.

In the drawings I have illustrated the narrow-tread tire-sections 5 shown in six parts; but it will be understood that the number of parts may be increased or decreased without departing from the nature of my invention, as the only object is to provide a means for attaching the segmental sections to an ordinary wide-tread traction-engine wheel or to the spaced tires 1.

In describing the present invention I have had special reference to attaching my improved narrow tire to old wheels; but in new work it will not be necessary to provide the number of sections for the narrow tread, and, in fact, the narrow-tread portion may be formed integral with the wide-tread portion of the tire.

Upon soft or sandy surfaces the narrow extended tire will sink to a distance to allow the wide-tread portion to ride upon the material located at the side of the narrow tread, thereby providing a wheel that will be propelled or moved over soft or sandy surfaces with greater ease than a wide tire of the same plane throughout its entire length.

I am also enabled to provide a wheel that can be used upon roads regardless of their condition—that is to say, either soft or hard.

In Fig. 3 I have illustrated a wide tire formed of a single band of a width to correspond with the width of the tread, and to this wide tire 8 the narrow extended tire is attached, thereby providing a wheel of two distinct diameters having two distinct treads, either tread capable of supporting the wheel either upon soft or hard surface roads.

When the narrow-tread tire is formed in sections, for the purpose of holding the sections in proper relative position the end of one section is provided with the projection 9, which projection is seated into a correspondingly-formed recess 10.

For the purpose of preventing slipping the various tires are provided with antifriction-ribs 11 and 12, the antifriction slipping-ribs 12 being upon the narrow-tread tire, so that when the engine is supported upon hard surfaces and upon its narrow tread slipping will be prevented, the same being true when the narrow tread sinks into soft-surface roads. The antifriction-ribs 11 will act to prevent the wheel from slipping.

Having fully described my invention, what I claim as new, and desire to secure by Letters Patent, is—

1. In a wheel of the class described, a wide-tread tire and a narrow-tread tire of greater diameter than the diameter of the wide-tread tire, and the narrow-tread tire formed in sections, and the sections located upon the circumference of the wide-tread tire and secured thereto, substantially as and for the purpose specified.

2. In a wheel of the class described wide-tread tires spaced from each other, narrow-tread tire-sections located upon the circumference of the wide-tread tires and over the space between said wide-tread tires and the narrow-tread tire-sections secured to the wide-tread tires, substantially as and for the purpose specified.

3. A wheel for traction-engines, provided with two tread-faces or tires of different diameters, the lesser diameter constituting a wide tread, and the greater diameter a narrow tread, and said narrow tread located in the center of the wide tread and adapted to carry the weight upon a hard surface, and the wide tread adapted to carry the weight upon a soft surface, and the wide and narrow treads provided with antifriction-ribs, substantially as and for the purpose set forth.

4. A wheel for traction-engines provided with two faces or tires of different diameters, the lesser diameter constituting a wide tread, and the greater diameter a narrow tread, the narrow tread located in the center of the wide tread, and the narrow tread provided with antifriction-ribs, substantially as set forth.

In testimony that I claim the above I have hereunto subscribed my name in the presence of two witnesses.

AMOS HARROLD

Witnesses:
RALPH NORPELL,
W. S. WEIANT